United States Patent

[11] 3,580,352

| [72] | Inventors | Erling Hestad<br>Pontiac;<br>Thomas E. Ritter, Utica; Alton G. De Claire, Jr., Grosse Pointe Woods, Mich. |
|---|---|---|
| [21] | Appl. No. | 792,466 |
| [22] | Filed | Jan. 21, 1969 |
| [45] | Patented | May 25, 1971 |
| [73] | Assignee | General Motors Corporation<br>Detroit, Mich. |

[54] STEERING TORQUE SERVO
3 Claims, 3 Drawing Figs.

[52] U.S. Cl. .................................................. 180/79.2, 73/136
[51] Int. Cl. .................................................. B62d 5/00
[50] Field of Search .................................................. 180/79.1, 79.2; 73/136 (A)

[56] References Cited
UNITED STATES PATENTS
1,125,776  1/1915  Thompson .................... 73/136(A)
1,946,100  2/1934  Norton ......................... 73/136(A)
2,754,465  7/1956  Brier ............................ 180/79.1X
2,930,247  3/1960  Zinn ............................. 180/79.1X
3,011,579  12/1961  Milliken et al. ............... 180/79.2

FOREIGN PATENTS
385,792  10/1920  Germany ..................... 73/136(A)

Primary Examiner—Benjamin Hersh
Assistant Examiner—John A. Pekar
Attorneys—E. W. Christen and Creighton R. Meland ABSTRACT: A vehicle-steering system in which the steering column may be mechanically disengaged from the steering linkage after which steering control is accomplished by generation of electrical signals representing desired dirigible wheel position. Steering "feel" is provided by a controlled torque motor connected to the steering column through a torsion bar torque sensor.

PATENTED MAY 25 1971

3,580,352

INVENTORS
Erling Hestad,
Thomas E. Ritter, &
Alton G. DeClaire, Jr.

3,580,352

STEERING TORQUE SERVO

SUMMARY OF THE INVENTION

This invention relates to vehicular-steering systems and more particularly to such a system in which a controlled torque is applied to the steering member to produce a handling or steering feel of variable characteristic.

In a conventional steering system for vehicles a mechanical system extends from the steering wheel to the dirigible wheels. Therefore, road feel is transmitted to the operator through the mechanical linkage from the dirigible wheels. This is so whether or not the conventional mechanical-steering system is power assisted.

In an electric power-steering system, on the other hand, there may be no mechanical coupling from the steering wheel to the dirigible wheels. Rather, steering command signals may be generated by means of a signal generator responsive to rotation of the steering wheel. This signal generator may apply an electrical signal to power means for positioning the dirigible road wheels according to the angular displacement of the steering wheel. In this case there is no direct link between the dirigible wheels and the operator and it becomes desirable to simulate road feel.

According to the prior art this feel may be produced in various ways but in general it might be said that the prior art method involves the generation and the application to the steering wheel of a controlled torque. In a representative system the controlled torque is sensed by a strain gauge which generates an electrical signal which can be monitored to control the magnitude of the torque.

In accordance with the present invention, a steering system of the type described may be improved by the application of an apparatus for applying a variable torque to a manual steering control element such as a steering wheel. The apparatus with which the subject invention is concerned comprises a torsion bar connecting a torque motor to a load device such as a steering column. In association with the torsion bar, an angular displacement signal generator has a rotor member connected to the output or measurement end of the torsion bar and a stator which is mechanically connected to the input or measurement end of the torsion bar. Torque transferred through the bar tends to rotate one end with respect to the other and therefore rotate the signal displacement generator rotor with respect to the stator to produce an electrical signal which is representative of the torsional load across the bar.

This device, as described herein, is particularly useful in connection with power steering systems wherein a controlled torque is to be applied to the manual input control member. It is to be understood that the torque monitoring apparatus is not limited to such an application.

Further advantages and features of the invention will become apparent upon reading of the following specification which describes a specific embodiment of the invention as applied to power-steering systems. This description is to be taken with the accompanying drawings of which:

Figure 1:
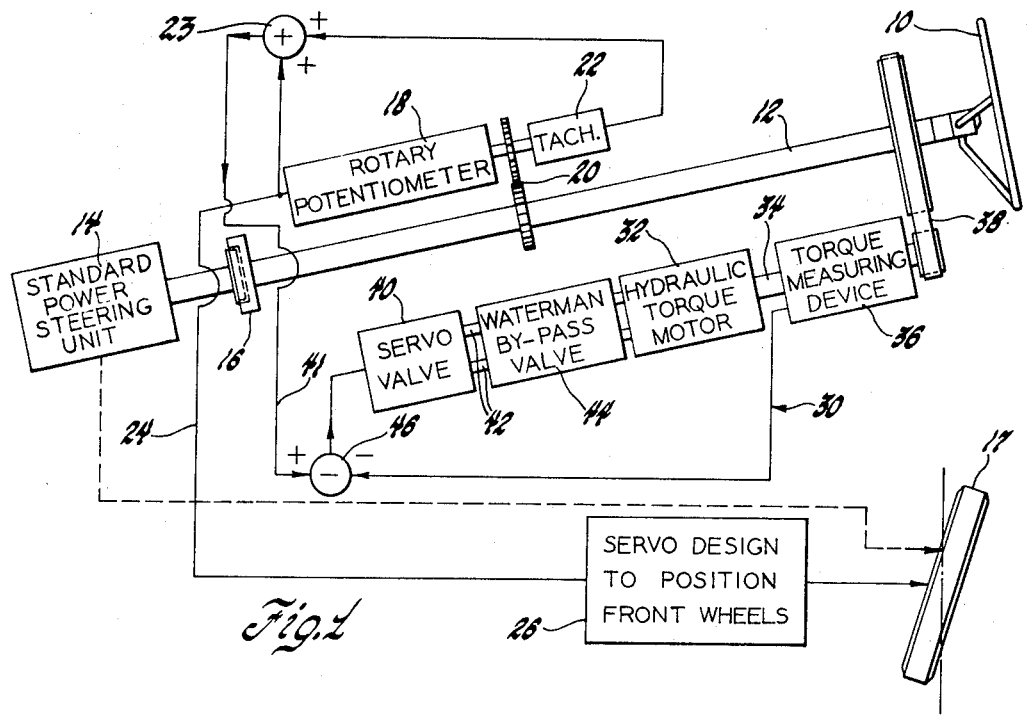
FIG. 1 is a block diagram of a steering system embodying the subject invention.

In FIG. 1 an electric power-steering system comprises a manual control element in the form of a conventional steering wheel 10. The wheel 10 is connected to a steering column 12, which in turn is connected to a standard power-steering unit 14 through a selectively disengageable clutch 16. Unit 14 thus operates to position one or more dirigible road wheels 17.

With the clutch 16 engaged, steering of a vehicle incorporating the system as shown in FIG. 1 is accomplished in the conventional fashion. With clutch 16 disengaged, an electric steering control signal is generated by means of a rotary potentiometer 18 which is mechanically connected to column 12 by means of gear set 20. Potentiometer 18 generates a DC voltage which varies in magnitude and polarity in accordance with the angular displacement of the steering wheel 10 from a reference position. Signals from rotary potentiometer 18 are connected by means of line 24 to a signal responsive servo unit 26 which is mechanically connected to the dirigible road wheel 17.

A tachometer generator 22 is connected to column 12 to produce a signal proportional to the rate of displacement of wheel 10. This signal is fed to an adder 23 along with the signal from potentiometer 18 for purposes to be described.

When the electrical-steering system described above is in operation, a steering feel of controlled characteristics may be applied to the steering column 12 and hence to the wheel 10 by means of the servo loop generally designated at 30. Servo loop 30 comprises an hydraulic torque motor 32 which is adapted to rotate an output shaft 34. Shaft 34 is connected through a torque-measuring device 36 to the steering column 12 by means of a belt drive 38. To control torque motor 32, the output of adder 23 is connected to a servo valve 40 by way of line 41 to regulate the flow of fluid through hydraulic lines 42 to the torque motor 32. Lines 42 may be connected through a bypass valve 44 as shown. Modifying the potentiometer 18 signal with the signal from tachometer generator 22 introduces a damping feel into the system as will be apparent from the following description. Other signals such as vehicle yaw rate and lateral acceleration can also be applied to adder 23 if desired.

In accordance with the invention, the modified steering wheel displacement signal from adder 23 is compared at 46 to the output signal from the torque-measuring device 36 which represents the torque applied to the steering column 12 by motor 32. At comparator 46 the torque signal from device 36 is subtracted from the manual input command signal and the resulting error signal is applied to servo valve 40. The servo loop 30 is thus effective to drive the error signal toward zero such that the torque applied to the steering wheel 10 is proportional to the angular position of wheel 10.

Figure 2:
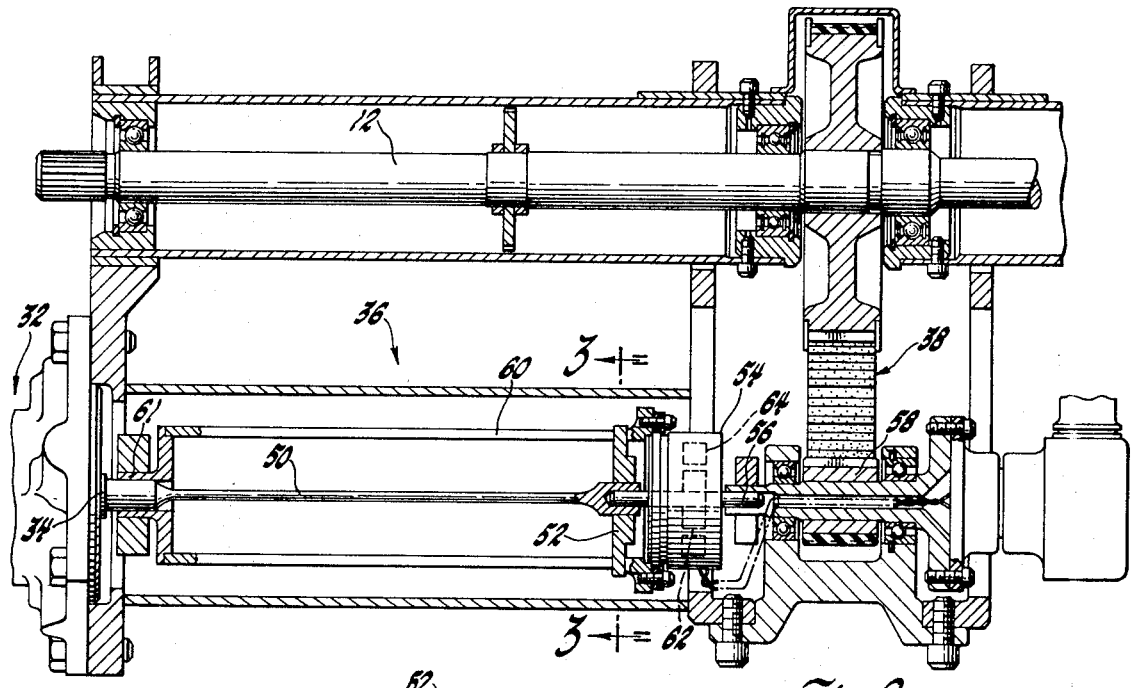
FIG. 2 is a detailed drawing of a specific embodiment of the novel torque-sensing apparatus.

Referring now to FIG. 2, selected components of the servo loop 30 including the torque-measuring device 36 are shown in greater detail. In FIG. 2 the torque-measuring device 36 is shown to comprise an elongated torsion bar 50 which is spline fitted to the output shaft 34 of torque motor 32. The other end of torsion bar 50 is fastened by means of a clamp 52 to the rotary shaft of a potentiometer 54. The rotary shaft 56 of potentiometer 54 is key fitted to a pulley 58 which forms part of the belt drive 38 between the torque measuring device 36 and the steering column 12. The housing of the potentiometer 54 is fastened by means of screws or other suitable fasteners to the housing 60 of the torsion bar 50 which in turn is mechanically connected at 61 to the end of the torsion bar 50 adjacent the torque motor 32.

The potentiometer 54 comprises a rotor portion 62 which rotates with torsion bar 50 and a stator portion 64 which is fixed to the housing 54. The electrical output of the potentiometer 54 is a DC voltage representing the angular displacement from a reference position between the rotor 62 and the stator 64.

To carry out the objectives of the measurement technique described herein the rotor 62 of the potentiometer 54 is mechanically connected to shaft 56 so as to rotate therewith. The stator portion 64 of potentiometer 54 is mechanically connected to the opposite end of bar 50 by a cylindrical housing 60 which coaxially encloses bar 50 throughout its length. In this specification, the end of torsion bar 50 adjacent rotor 62 is termed the "measurement" end. Accordingly, when a load is applied to the torsion bar by means of belt drive 38 and an input torque is applied by means of motor 32, the resulting windup of bar 50 causes the rotor 62 of potentiometer 54 to be angularly displaced relative to the stator 64. Since the stator 64 represents the position of the reference end of bar 50, potentiometer 54 thus indicates the output proportional to the torque transmitter by torsion bar 50.

It is also apparent that the entire assembly comprising torsion bar 50, potentiometer 54 and cylindrical housing 60 may rotate continuously without loss of information pertaining to the torque transmitted to cross the device 36. Under such circumstances it is necessary to connect the signal from potentiometer 54 to an outside measuring device, not shown, by means of a slipring assembly.

The torque-measuring device 36 comprising torsion bar 50 shown in FIG. 2 is of particular advantage as applied to the measurement of transmitted torques in a power-steering system as described herein. In particular, the torque-measuring device 36 exhibits a high sensitivity to torque and under normal circumstances no amplification of the signal output from potentiometer 54 is necessary. Further, the device 36 does not change sensitivity with temperature as is often the case with strain gauge type torque-measuring devices. Moreover, the electrical output from potentiometer 54 under zero torque conditions is zero, whereas for strain gauges the zero position often drifts, necessitating frequent balancing procedures.

The use of the flexible torsion bar 50 between the torque motor 32 and the steering column 12 of the power-steering system described herein makes it possible to increase the product of the torque signal gain by the sensitivity of servo valve 40 quite significantly without encountering stability problems. The result is that the friction feel in the power-steering system is reduced to a point of insignificance. In addition, the increased overall gain improves the returnability of steering wheel 10 to the neutral position which, as previously indicated, is not subject to drift.

Figure 3:
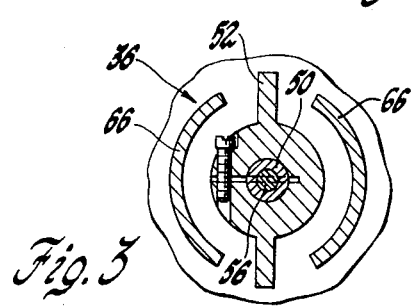
FIG. 3 is a cross-sectional view of part of the FIG. 2 apparatus.

FIG. 3 illustrates, in cross section, the use of stops 66 which limit the angular displacement of the assembly including torsion bar 50.

It is to be understood that the foregoing description of a specific embodiment of the invention is not to be construed in a limiting sense for various modifications and additions to this system will be apparent to those skilled in the art.

What we claim is:

1. A vehicle-steering system comprising a manual control element, at least one dirigible wheel, power means for positioning said wheel and signal-generating means connected to the element for supplying an output to the power means for positioning the wheel according to manual inputs to the element, a torque motor having an output shaft, means for mechanically connecting the shaft to the control element and measuring the torque applied including a torsion bar having a reference end connected to the output shaft and a measurement end connected to the control element, an angular displacement signal generator having a rotor and a stator for producing electrical signals related to the angle of displacement therebetween, the rotor being mechanically connected to the measurement end of the torsion bar and the stator being mechanically connected to the reference end of the torsion bar whereby said electrical signals relate to the torsional load across the bar.

2. Apparatus as described in claim 1 further including means for comparing the electrical signals relating to torsional load to the output of said signal-generating means to produce an error signal, and means for applying the error signal to control the torque motor to drive the error signal toward zero.

3. An electric power-steering system for vehicles comprising a rotatable steering member, signal-generating means for producing an electrical signal of varying character representing desired position of a dirigible vehicle wheel, power means responsive to the signal for positioning the wheel, a road-feel-generating servo loop comprising a torque motor responsive to desired dirigible wheel position to produce a mechanical output, a torque sensor connecting the motor to the rotatable steering member to produce a torque resisting rotation thereof away from a reference position, said sensor comprising a torsion bar having one end connected to the motor and the other end connected to the steering member, means for directly measuring angular displacement of one end of the bar relative to the other end, and means for comparing said displacement to the rotary position of said steering member.